(12) United States Patent
Takano et al.

(10) Patent No.: US 10,452,985 B2
(45) Date of Patent: Oct. 22, 2019

(54) APPARATUS, METHOD, AND PROGRAM FOR SELECTING EXPLANATORY VARIABLES

(71) Applicant: MIZUHO-DL FINANCIAL TECHNOLOGY CO., LTD., Chiyoda-ku, Tokyo (JP)

(72) Inventors: Yasushi Takano, Tokyo (JP); Ryuichi Sato, Tokyo (JP); Tatsuro Ishijima, Tokyo (JP); Kazuyoshi Yoshino, Tokyo (JP)

(73) Assignee: Mizuho-DL Financial Technology Co., Ltd., Tokyo (JP)

( * ) Notice: Subject to any disclaimer, the term of this patent is extended or adjusted under 35 U.S.C. 154(b) by 0 days.

(21) Appl. No.: 15/771,599

(22) PCT Filed: Oct. 20, 2016

(86) PCT No.: PCT/JP2016/081071
§ 371 (c)(1),
(2) Date: Apr. 27, 2018

(87) PCT Pub. No.: WO2017/073445
PCT Pub. Date: May 4, 2017

(65) Prior Publication Data
US 2018/0314964 A1 Nov. 1, 2018

(30) Foreign Application Priority Data
Oct. 30, 2015 (JP) ................................ 2015-214653

(51) Int. Cl.
*G06N 7/00* (2006.01)
*G06N 5/02* (2006.01)
(Continued)

(52) U.S. Cl.
CPC ............... *G06N 7/00* (2013.01); *G06F 17/17* (2013.01); *G06F 17/18* (2013.01); *G06K 9/6231* (2013.01); *G06N 5/02* (2013.01); *G06Q 40/02* (2013.01)

(58) Field of Classification Search
CPC .......... G06N 7/00; G06N 5/02; G06K 9/6231; G06F 17/17; G06F 17/18; G06Q 40/02
(Continued)

(56) References Cited

U.S. PATENT DOCUMENTS

| 2005/0071218 A1* | 3/2005 | Lin ........................ G06Q 30/00 705/14.44 |
| 2009/0132450 A1* | 5/2009 | Schlottmann ............ G06N 3/02 706/21 |
| 2012/0066106 A1* | 3/2012 | Papadimitriou ....... G06Q 40/00 705/35 |

OTHER PUBLICATIONS

Tibshirani, "Regression shrinkage and selection via the lasso", A retrospective, Journal of the Royal Statistical Society B, 73 , 2011, pp. 273-282.
(Continued)

*Primary Examiner* — Eunhee Kim
(74) *Attorney, Agent, or Firm* — Buchanan Ingersoll & Rooney PC

(57) ABSTRACT

Provided is an apparatus which selects desired explanatory variables from a plurality of candidate explanatory variables in a statistical model that expresses, by a predetermined function, a relationship between a linear predictor and an expectation value of a response variable or a probability of the response variable having certain values, by using a variable selecting model that expresses the linear predictor as a sum of a constant and a linear combination of the candidate explanatory variables and their corresponding coefficients, the apparatus including a sign condition acquisition unit for acquiring sign conditions for at least one of the
(Continued)

coefficients; an estimator for calculating an estimate of the respective coefficients and an estimate of the constant under the sign conditions, using plural data; and a selection unit for selecting, as the desired explanatory variable, the candidate explanatory variable corresponding to the coefficient of which the estimate is calculated to be non-zero.

18 Claims, 4 Drawing Sheets

(51) Int. Cl.
  *G06F 17/17* (2006.01)
  *G06K 9/62* (2006.01)
  *G06Q 40/02* (2012.01)
  *G06F 17/18* (2006.01)
(58) Field of Classification Search
  USPC .......................................................... 703/2
  See application file for complete search history.

(56) References Cited

OTHER PUBLICATIONS

Yasukawa, "Sample • Selection • Model ni yoru Shasai Kakuzuke no Hikaku" , Gendai Finance, no. 10, Sep. 30, 2001, pp. 63-83.
Zou, et al., "Regularization and Variable Selection via the Elastic Net" , Journal of the Royal Statistical Society, Series B, 2005, pp. 301-320.
International Search Report (PCT/ISA/210) dated Nov. 22, 2016, by the Japanese Patent Office as the International Searching Authority for International Application No. PCT/JP2016/081071.
Written Opinion (PCT/ISA/237) dated Nov. 22, 2016, by the Japanese Patent Office as the International Searching Authority for International Application No. PCT/JP2016/081071.

\* cited by examiner

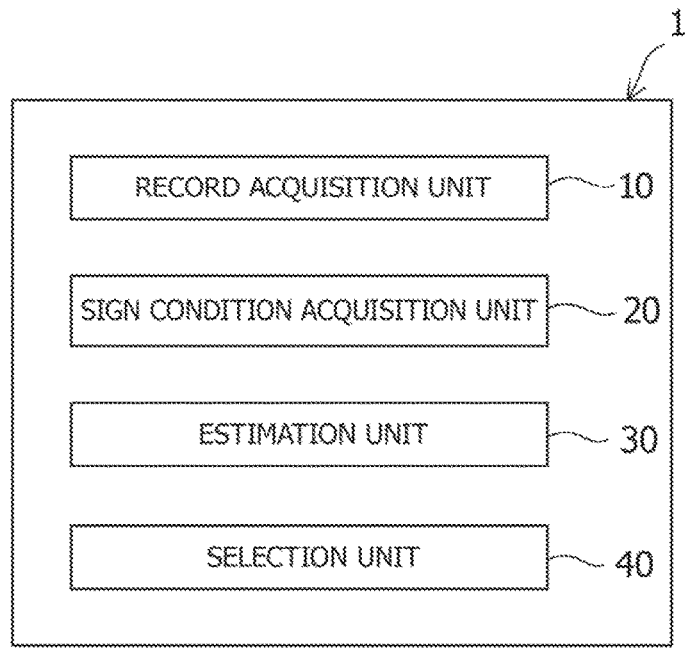
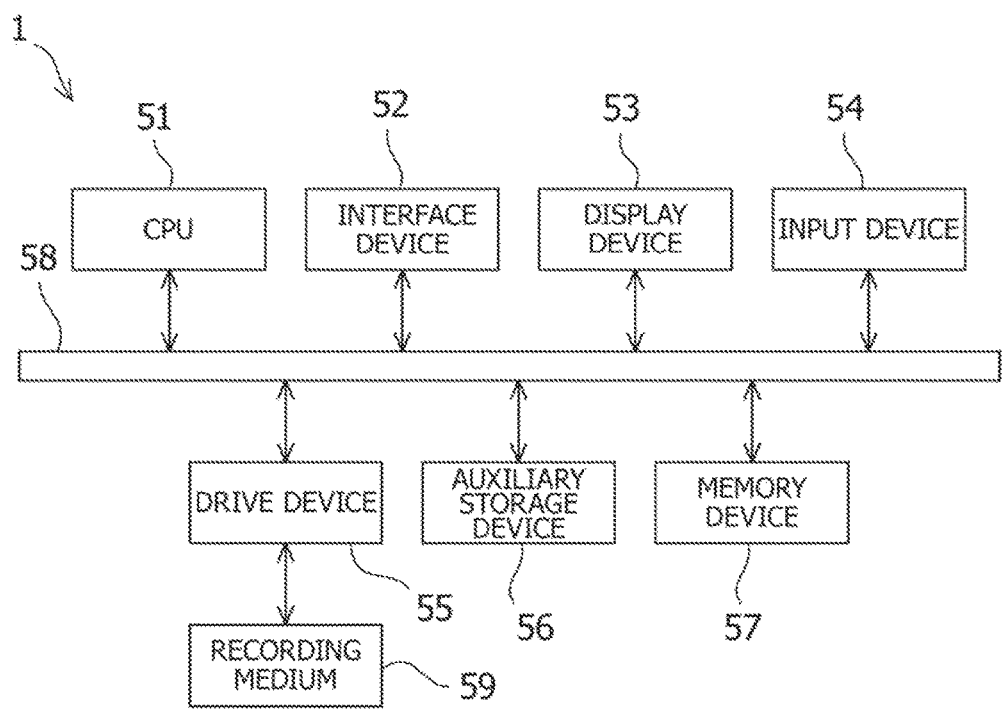

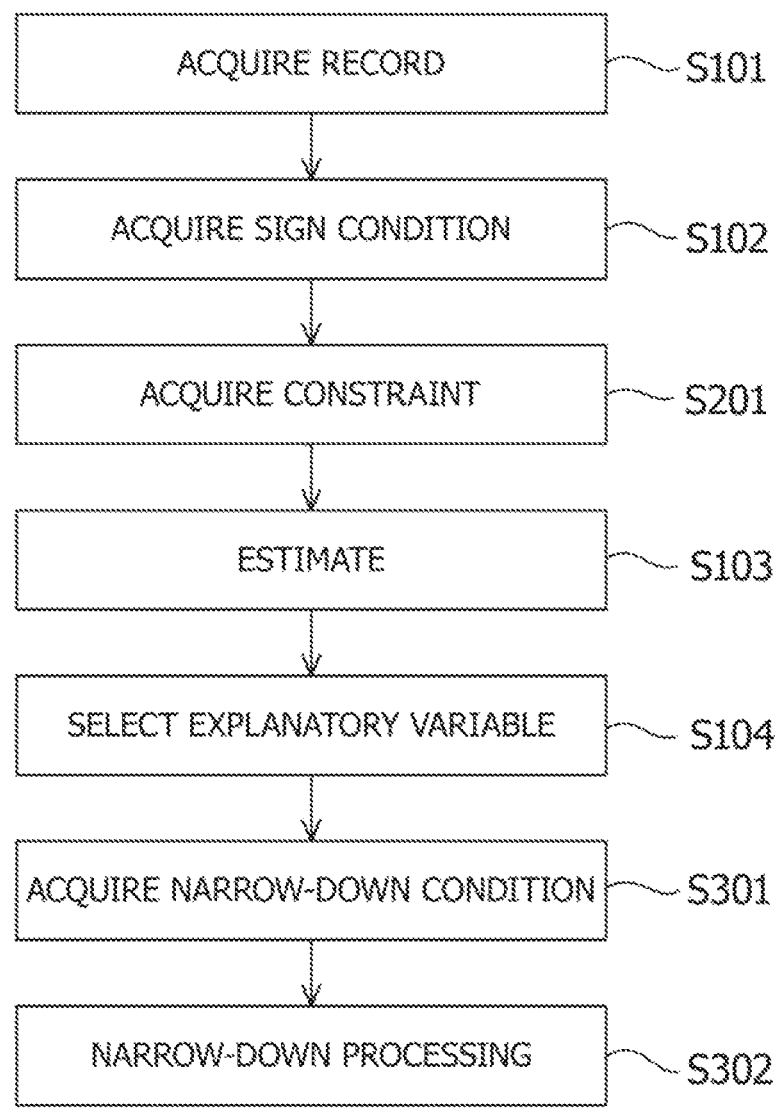

APPARATUS, METHOD, AND PROGRAM FOR SELECTING EXPLANATORY VARIABLES

TECHNICAL FIELD

The present invention relates to an apparatus, method, and program for selecting explanatory variables.

BACKGROUND ART

Using statistical models, various phenomena, such as a natural phenomenon or a social phenomenon, have been explained and predicted. An example of the statistical model is given by:

$$\begin{cases} Z = \alpha + \beta_1 x_1 + \beta_2 x_2 + \ldots & (1) \\ F(E[Y]) = Z & (2) \end{cases}$$

where $x_1, x_2, \ldots$ represent variables called "explanatory variables"; $\beta_1, \beta_2, \ldots$ are coefficients respectively corresponding to explanatory variables $x_1, x_2, \ldots$; and $\alpha$ is a constant.

In equation (1), Z, defined by the sum of the constant $\alpha$ and a linear combination of explanatory variables and coefficients, is called a linear predictor; and Y is a variable called a response variable. As understood from equation (2), function F defines a relationship between linear predictor Z and expectation value E[Y] of the response variable Y. In this context, function F is not always given by a simple equation, and sometimes is expressed by a composite of plural functions or by a function to be solved numerically because it cannot be given in an analytic form.

For example, the weight is a response variable and the height and waist size can serve as explanatory variables.

One such statistical model is a generalized linear model. Examples of the generalized linear model include a linear regression model, a binomial logit model, and an ordered logit model.

The above statistical models have difficulty in selecting appropriate indicators as explanatory variables. As is known, this becomes an issue of concern in variable selection itself. The variable selection greatly affects the precision and usability of the statistical model.

So-called "brute-force regression" is one approach to select appropriate explanatory variables. With this approach, all possible sets of candidate explanatory variables are examined to find an optimum one. Here, p candidate explanatory variables will offer ($2^p-1$) sets in total. Testing all possible sets, this approach can provide really the best set of variables but imposes a very large computational load. If the number of candidate variables p is large, the number of possible sets explosively increases, making the calculation virtually impractical.

Stepwise regression is another approach to the variable selection. With this approach, explanatory variables are sequentially added to or subtracted from a model based on some criterion such as an F value used in regression analysis, so as to find a more descriptive set of variables. This approach requires a relatively low computational load, and thus, can target many candidate variables. It, however, cannot always give an optimum set of explanatory variables.

In addition, Non-Patent Literature 1 discloses variable selection called "Lasso regression". Non-Patent Literature 2 discloses variable selection called "elastic-net". Either one uses a function given by adding a coefficient-dependent penalty term to a likelihood function, so as to select as explanatory variables the variable corresponding to each of the coefficients which has a non-zero value when the function becomes maximum. According to these, the selection of explanatory variables depends on a parameter called a hyperparameter, which regulates a penalty, but the parameter concerned can be selected freely. In addition, a set of selected explanatory variables generally is not meant to maximize the likelihood function itself.

REFERENCE LIST

Non-Patent Literature

Non-Patent Literature 1: R. Tibshirani, "Regression shrinkage and selection via the lasso", A retrospective, Journal of the Royal Statistical Society B, 73, 273-282, 2011

Non-Patent Literature 2: Hui Zou and Trevor Hastie, "Regularization and Variable Selection via the Elastic Net", Journal of the Royal Statistical Society, Series B: 301-320, 2005

SUMMARY OF INVENTION

Technical Problem

The present invention has been made in view of the above background art and it is accordingly an object of the invention to efficiently select explanatory variables from even a relatively large number of candidate explanatory variables.

Solution to Problem

In order to achieve the above object, the present invention provides an apparatus for selecting desired explanatory variables from a plurality of candidate explanatory variables in a statistical model that expresses, by a predetermined function, a relationship between a linear predictor and an expectation value of a response variable or a probability of the response variable having certain values, by using a variable selecting model that expresses the linear predictor as a sum of a constant and the linear combination of the candidate explanatory variables and their corresponding coefficients. The apparatus comprises a sign condition acquisition unit for acquiring sign conditions that define every possible value of at least one of the coefficients as zero or more, or zero or less; an estimation unit for calculating an estimate of the respective coefficients and an estimate of the constant under the sign conditions, using a plurality of data inclusive of realizations of the respective candidate explanatory variables and realizations of the response variable; and a selection unit for selecting, as the desired explanatory variables, the candidate explanatory variables corresponding to each of the coefficient of which the estimate is calculated to be non-zero.

The present invention also provides an apparatus for selecting desired explanatory variables from a plurality of candidate explanatory variables in a statistical model that expresses, by a predetermined function, a relationship between a plurality of linear predictors and an expectation value of a response variable or probability of the response variable having certain values, by using a variable selecting model that expresses at least one of the linear predictors as a sum of a constant and the linear combination of the candidate explanatory variables and their corresponding coefficients. The apparatus comprises a sign condition acquisition unit for acquiring sign conditions that define every possible value of at least one of the coefficients as zero or more, or zero or less; an estimation unit for calculating an estimate of the respective coefficients and an estimate of the constant under the sign conditions, using a plurality of data inclusive of realizations of the respective candidate explanatory variables and realizations of the response variable; and a selection unit for selecting, as the desired explanatory variable, the candidate explanatory variables corresponding to each of the coefficient of which the estimate is calculated to be non-zero.

Advantageous Effects of Invention

According to the present invention, explanatory variables can be efficiently selected even from a relatively large number of candidate explanatory variables.

BRIEF DESCRIPTION OF DRAWINGS

FIG. 1 is an explanatory view showing a functional configuration example of a variable selecting apparatus;

FIG. 2 is an explanatory view of a hardware configuration example of the variable selecting apparatus.

FIG. 7 is a flowchart of still another procedure example executed by the variable selecting apparatus.

DESCRIPTION OF EMBODIMENTS

Figure 3:
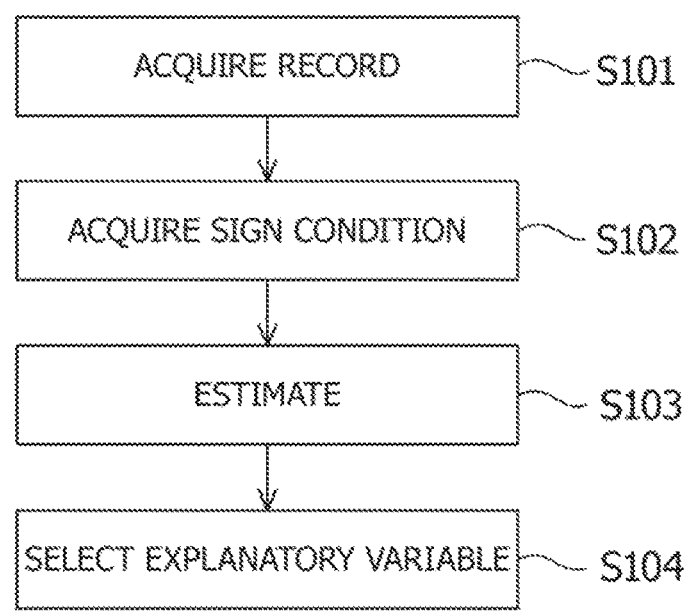
FIG. 3 is a flowchart of a procedure example executed by the variable selecting apparatus.

As explained above, the selection of explanatory variables faces a problem that numerous potential explanatory variables will lead to a huge number of possible sets of variables. The inventors of the present invention have made extensive studies on this and other problematic issues.

In selecting explanatory variables, it is also necessary to consider the sign of a coefficient corresponding to an explanatory variable. Suppose a statistical model that holds "expectation value of weight=$\alpha+\beta_1 \times$height+$\beta_2 \times$waist size", for example. As a general assumption, a taller man weighs more. Thus, if the height is selected as an explanatory variable, then coefficient $\beta_1$ is expected to be positive. Likewise, it is thought that a man with a larger waste weighs more. Then, if the waist size is selected as an explanatory variable, coefficient $\beta_2$ is expected to be positive. In this regard, $\beta_2$ of negative value will give a contradictory suggestion that "a man with a larger waist is lighter than someone who has the same height but a smaller waist". Such a model is really difficult to use.

As exemplified in the previous paragraph, the condition that "each coefficient in a statistical model should have the same sign expected from the relationship between a single explanatory variable and a response variable", is called a "sign condition" (sign restriction). An estimate of a coefficient in the statistical model is influenced by correlation between explanatory variables, etc. Thus, the statistical model using plural explanatory variables may not necessarily satisfy the sign conditions. Generally speaking, as the number of explanatory variables increases, the difficulty in producing a statistical model that can satisfy the sign conditions increases.

Note that the height and waist size correspond to explanatory variables $x_1$ and $x_2$, respectively, in equation (1) and the weight corresponds to the response variable Y in equation (2). Also, function F in equation (2) is an identity function, i.e., F (E[Y])=E[Y]=Z.

In some cases, various demands are added in selecting explanatory variables, such as "making sure a specific candidate explanatory variable can be necessarily selected as an explanatory variable" and "making sure an influence of a specific explanatory variable does not become too high." A kind of flexibility, as can meet such demands, is required for the variable selection.

Taking into account the above studies, embodiments of the present invention are described below. Note that the present invention is not limited to the following embodiments.

First Embodiment

This embodiment introduces a statistical model for evaluating a likelihood of a default, i.e., debt default of a certain business or person. A business or person, evaluated as being less likely to default, can be more reliable. Such a statistical model is referred to as a credit-evaluating model.

Many credit evaluating models for businesses use as explanatory variables financial indicators derived from a balance sheet and a profit-and-loss statement. Conceivable examples of the financial indicator include a capital ratio, years of debt redemption, a current account, and accounts receivable turnover period.

In addition, many credit-evaluating models for individuals use as explanatory variables indicators of personal attributes. Conceivable examples of such information include age, number of household members, income, and years of employment.

In either case, it is necessary to precisely assess a borrower's credit prior to judgements on a loan and loan interest. For that purpose, a high-precision credit-evaluating model is eagerly anticipated.

The credit-evaluating model is given by:

$$\begin{cases} Z = \alpha + \beta_1 x_1 + \beta_2 x_2 + \ldots & (3) \\ F[Pr\{\tilde{D}=1\}] = \log\left(\dfrac{Pr\{\tilde{D}=1\}}{1 - Pr\{\tilde{D}=1\}}\right) = Z & (4) \end{cases}$$

where $x_k$ (k=1, 2, . . . ) is an explanatory variable; $\beta_k$ is a coefficient corresponding to explanatory variable $x_k$; $\alpha$ is a constant; and Z is a linear predictor.

A response variable $\tilde{D}$ is a default flag, which is a variable equal to 1 for defaulting on a debt within one year from settlement of accounts, or otherwise 0.

$Pr\{\tilde{D}=1\}$ indicates the probability of the default flag being 1.

FIG. 1 shows a functional configuration example of a variable selecting apparatus 1 for selecting explanatory variables in a credit-evaluating model. The variable selecting apparatus 1 includes a record acquisition unit 10, a sign condition acquisition unit 20, an estimation unit 30, and a selection unit 40. The respective functional units are detailed later.

FIG. 2 shows an example of the configuration of computer hardware of the variable selecting apparatus 1. The variable selecting apparatus 1 includes a CPU 51, an interface device 52, a display device 53, an input device 54, a drive device 55, an auxiliary storage device 56, and a memory device 57, which are mutually connected via bus 58.

A program for executing functions of the variable selecting apparatus 1 is provided recorded on a recording medium 59 such as a CD-ROM. When the recording medium 59 with the recorded program is inserted into the drive device 55, the program is installed from the recording medium 59 via the drive device 55 to the auxiliary storage device 56. Alternatively, the program can be downloaded via a network from another computer instead of being installed from the recording medium 59. The auxiliary storage device 56 stores the installed program as well as a necessary file, data, etc.

If instructed to start the program, the memory device 57 reads and stores the program from the auxiliary storage device 56. The CPU 51 executes the functions of the variable selecting apparatus 1 according to the program stored in the memory device 57. The interface device 52 serves as an interface with another computer via a network. The display device 53 displays a GUI (Graphical User Interface) created by the program, for example. The display device 54 is a keyboard, a mouse, or the like.

Table 1 shows plural records used upon variable selection in a credit-evaluating model for businesses. The records are stored in the auxiliary storage device 56. The records are also referred to as data.

In this table, each record shows information about a certain business. The "default flag" is, as discussed above, a variable equal to 1 for defaulting on a debt within one year from settlement of accounts, or otherwise 0. The default flag is a response variable in the credit evaluating model.

Likewise, the "financial indicator" in Table 1 is calculated from business's accounting information in a balance sheet, a profit-and-loss statement, etc. For example, "logarithm of sales" is a logarithmic transformation of sales calculated from the accounting information. The "capital ratio", "years of debt redemption", "current ratio", and "ratio of interest burden to sales" are calculated from the accounting information. These indicators are candidate explanatory variables in the credit-evaluating model. Here, "k" indicates the number assigned to every candidate explanatory variable.

For example, the "capital ratio" of a "business A" with the business ID of "1" is "46.82%". This value is called a realization for the candidate explanatory variable "capital ratio". A realization of the response variable "default flag" is "0". As above, Table 1 includes plural records each containing realizations of plural candidate explanatory variables and that of the response variable.

Of course, the number of candidate explanatory variables is not limited as long as multiple variables are provided. In evaluating the credit of a business, a highly descriptive set of variables is selected from among numerous candidate explanatory variables (financial indicators) so as to evaluate its financial status from many aspects. In general, several tens to over a hundred candidate explanatory variables are prepared. As with the "logarithm of sales" in Table 1, a financial indicator subject to any transformation such as logarithmic transformation or discretization, can be used as a candidate explanatory variable.

A variable selecting model, which the variable selecting apparatus 1 uses in selecting a variable, is given by:

$$\begin{cases} Z = \alpha + \beta_1 X_1 + \beta_2 X_2 + \cdots & (5) \\ PD = \dfrac{1}{1 + \exp(Z)} & (6) \end{cases}$$

where $X_k$ (k=1, 2, . . . ) is a candidate explanatory variable; $\alpha$ is a constant; $\beta_k$ is a coefficient of candidate explanatory variable $X_k$; Z is a linear predictor; and PD is the probability of the response variable, or the default flag, is equal to "1".

TABLE 1

Model Building Data

| Business Attributes | | | | Financial Indicator (Candidate Explanatory Variable) | | | | |
| --- | --- | --- | --- | --- | --- | --- | --- | --- |
| Business ID | Business Name | Business Type | Default Flag | Logarithm of Sales (k = 1) | Capital Ratio (k = 2) | Years of Debt Redemption (k = 3) | Current Ratio (k = 4) | Ratio of Interest Burden to Sales (k = 5) |
| 1 | Business A | Construction | 0 | 9.016 | 46.82% | 6.43 | 129.95% | 1.29% ... |
| 2 | Business B | Manufacturer | 0 | 8.669 | 38.71% | 4.73 | 148.03% | 2.88% ... |
| 3 | Business C | Retailer | 1 | 9.474 | 19.86% | 16.82 | 101.74% | 4.51% ... |
| 4 | Business D | Supplier | 0 | 10.318 | 64.93% | 2.11 | 211.30% | 0.47% ... |
| . | . | . | . | . | . | . | . | . |
| . | . | . | . | . | . | . | . | . ... |
| . | . | . | . | . | . | . | . | . |

PD is also referred to as the probability of default.

As mentioned above, the variable selecting model is a statistical model that defines a linear predictor by the sum of the constant and linear combination of plural candidate explanatory variables and their corresponding coefficients.

Here, linear predictor Z in equation (6) has a positive sign, whereby the relationship of "the more the value of Z, the higher the credit" holds. Needless to say, "Z" in equation (6) could be "−Z" such that function F is the distribution function of logistic distribution.

Next, the relationship between an estimate of the probability of default and realizations of candidate explanatory variables in the variable selecting model, is defined by:

$$\begin{cases} Z_i = \alpha + \beta_1 X_{i,1} + \beta_2 X_{i,2} + \cdots & (7) \\ PD_i = \dfrac{1}{1 + \exp(Z_i)} & (8) \end{cases}$$

where i represents the business ID in Table 1; $X_{i,k}$ is a realization of candidate explanatory variable $X_k$ for the business i; $Z_i$ is a score of the business i; and $PD_i$ is an estimate of the probability of default for the business i in the variable selecting model.

Also, constant $\alpha$ and coefficient $\beta_k$ are collectively called parameters, and a parameter vector is indicated by $\theta$.

This yields $$\theta = (\alpha, \beta_1, \beta_2, \ldots) \qquad (9)$$

Table 2 shows sign conditions of the respective coefficients used by the variable selecting apparatus 1. The sign condition is a set for each coefficient and defines every possible value of each coefficient as 0 or more, or 0 or less. The sign conditions are stored in the auxiliary storage device 56.

TABLE 2

Sign Condition

| Coefficient | Sign Condition |
|---|---|
| $\beta_1$ | 0 or more |
| $\beta_2$ | 0 or more |
| $\beta_3$ | 0 or less |
| $\beta_4$ | 0 or more |
| $\beta_5$ | 0 or less |
| ... | ... |

The sign condition of "0 or more" is a set for a candidate explanatory variable that will show higher credit when it is large, while "0 or less" is a set for a candidate explanatory variable that will show higher credit when it is small. In this embodiment, the sales (k=1), the capital ratio (k=2), and the current ratio (k=4) will show higher credit when they are large. Thus, coefficients $\beta_1$, $\beta_2$, and $\beta_4$ are given the sign condition of "0 or more". In contrast, the years of debt redemption (k=3) and the ratio of interest burden to sales (k=5) will show higher credit when they are small. Thus, coefficients $\beta_3$ and $\beta_5$ are given the sign condition of "0 or less".

Referring to FIG. 3, a processing flow of the variable selecting apparatus 1 is explained next. First in step S101, the record acquisition unit 10 acquires plural records used in building a credit-evaluating model for businesses as shown in Table 1.

In step S102, the sign condition acquisition unit 20 acquires the sign conditions as shown in Table 2.

In step S103, the estimation unit 30 executes maximum likelihood estimation. More specifically, the estimation unit 30 calculates an estimate of each parameter that maximizes likelihood function $L(\theta)$ in the variable selecting model. The estimate is calculated from plural records acquired in step S101, also under the sign conditions acquired in step S102, i.e., the following condition $C_1$:

$$C_1: \beta_1 \geq 0, \beta_2 \geq 0, \beta_3 \leq 0, \beta_4 \geq 0, \beta_5 \leq 0, \ldots$$

A maximum likelihood estimator of a parameter vector $\theta$ defined in this step $$\hat{\theta} = (\hat{\alpha}, \hat{\beta}_1, \hat{\beta}_2, \ldots) \qquad (10)$$

holds $$\hat{\theta} = \arg\max_{\theta \in C_1} L(\theta) = \arg\max_{\theta \in C_1} \left\{ \prod_{i=1}^{N} PD_i^{D_i} (1 - PD_i)^{1-D_i} \right\}$$

As explained above, $L(\theta)$ represents the likelihood function; N is the number of records in Table 1; and $D_i$ is a default flag for the business i.

The maximum likelihood estimator given by equation (10) is estimated as $\theta$ that maximizes likelihood function $L(\theta)$ under condition $C_1$.

There are plural algorithms for finding a maximum of likelihood function $L(\theta)$ under condition $C_1$ as above. A coordinate descent method and a steepest descent method, for example, are known. Of these, the coordinate descent method, for example, can target numerous candidate explanatory variables quickly. Any kind of algorithm is available in this embodiment.

Here, it is known that an estimator of this embodiment, calculated from a conditional parameter value, shows the same asymptotic normality or consistency as a normal maximum likelihood estimator. Details thereof can be found in Non-Patent Literature "T. J. Moore, B. M. Sadler, Maximum-likelihood estimation and scoring under parametric constrains. Army Research Lab, Aldelphi, Md., Tech. Rep. ARL-TR-3805, 2006".

Table 3 shows estimates of the parameters obtained in this step.

TABLE 3

Estimates of Constant/Coefficient

| Constant/Coefficient | Estimate |
|---|---|
| $\alpha$ | 8.90 |
| $\beta_1$ | 0.00 |
| $\beta_2$ | 0.00 |
| $\beta_3$ | 0.00 |
| $\beta_4$ | 6.77 |
| $\beta_5$ | −437.16 |
| ... | ... |

Coefficients $\beta_1$, $\beta_2$, and $\beta_3$ corresponding to sales, a capital ratio, and years of debt redemption, respectively, are all estimated to be zero. Coefficients $\beta_4$ and $\beta_5$ corresponding to a current ratio and a ratio of interest burden to sales, respectively, are each estimated as a non-zero coefficient, which satisfies the sign conditions.

In step S104, the selection unit 40 selects desired explanatory variables. More specifically, it determines whether a coefficient value estimated in step S103 is zero or non-zero, and selects candidate explanatory variables corresponding to the non-zero coefficient as desired explanatory variables. In this embodiment, the current ratio and the ratio of interest burden to sales corresponding to non-zero coefficients $\beta_4$ and $\beta_5$, respectively are selected as desired explanatory variables.

A desired statistical model with the selected variables is:

$$\begin{cases} Z = \alpha + \beta_4 x_4 + \beta_5 x_5 + \ldots \\ \phantom{Z} = 8.90 + 6.77 x_4 + (-471.36) x_5 + \ldots \\ PD = \dfrac{1}{1 + \exp(Z)} \end{cases}$$

where $x_4$ and $x_5$ indicate desired explanatory variables, corresponding to candidate explanatory variables $X_4$ and $X_5$, respectively.

Advantageous Effects

This embodiment ensures rapid variable selection. As mentioned above, rapid estimation can be effected even on numerous candidate explanatory variables by using the coordinate descent method or other such algorithms. Moreover, the selection of explanatory variables can be done within almost the same time as normal maximum likelihood estimation with no sign condition.

Also, a set of candidate explanatory variables, as can maximize the likelihood under predetermined sign conditions, are selected, thereby eliminating the necessity for any manual post-processing. The sign-restricted variable selection and the unrestricted selection are compared below.

Figure 4:
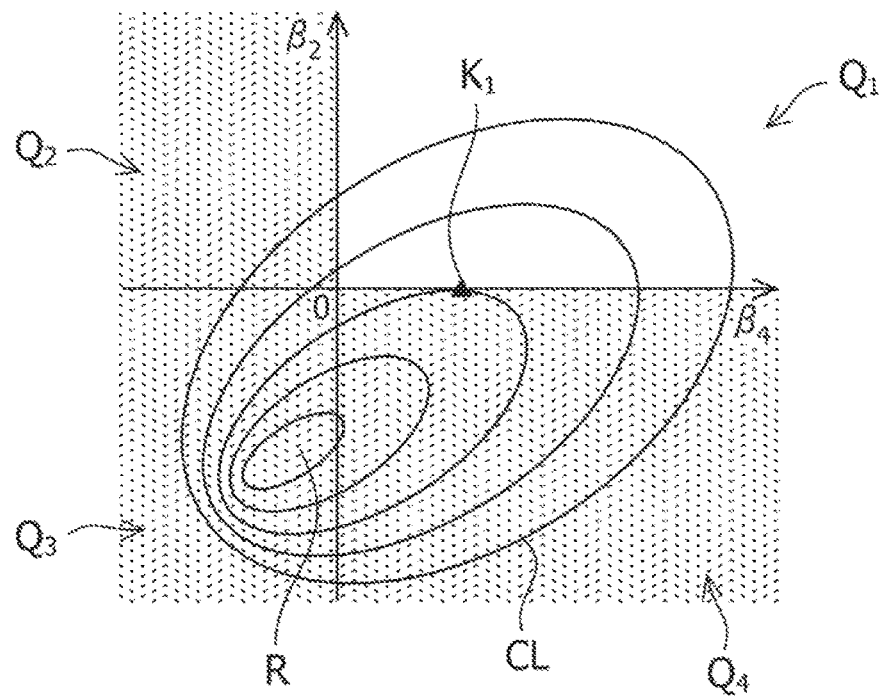
FIG. 4 is a conceptual diagram of how a coefficient is determined in selecting variables.

In FIG. 4, the horizontal axis represents coefficient $\beta_4$, the vertical axis represents coefficient $\beta_2$, and contour lines CL indicate the likelihood. The farther from a region R, the lower the likelihood. In this embodiment, estimation is made under condition $C_1$. That is, the estimation targets the first quadrant $Q_1$. This yields point $K_1$ as an estimate. Estimates satisfying the sign conditions, like a positive estimate for coefficient $\beta_4$ and an estimate of zero for coefficient $\beta_2$, can be obtained.

Figure 5:
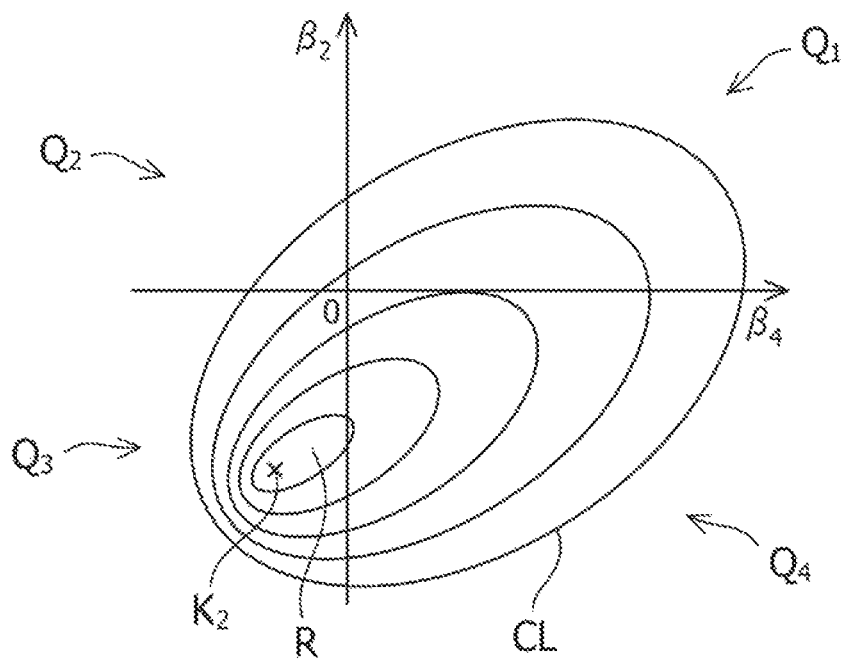
FIG. 5 is another conceptual diagram of how a coefficient is determined in selecting variables.

In contrast, FIG. 5 shows estimation without condition $C_1$ or other such conditions. The estimation targets all quadrants from the first quadrant $Q_1$ to the fourth quadrant $Q_4$, whereby point $K_2$, not satisfying the sign conditions, is found as an estimate.

As understood from the above, if no condition is set, the estimation has to target a wider range, and a resultant estimate may not satisfy the sign conditions. In contrast, according to this embodiment, the estimation is done under condition $C_1$ compliant with the sign conditions. This accordingly limits the target estimation range as well as provides an estimate satisfying the sign conditions. That is, an efficient estimation is possible.

As mentioned above, if the number of explanatory variables increases, it is more difficult to attain a statistical model that can satisfy sign conditions. This means that, if numerous candidate explanatory variables exist, many coefficients assume zero at a point where the likelihood function is maximized under the sign conditions like condition $C_1$. In other words, setting the sign conditions narrows down the explanatory variables.

Moreover, a desired set of explanatory variables can be selected, which maximizes the likelihood, from among all possible sets of variables satisfying the sign conditions. Thus, it is possible to find a set of explanatory variables that shows a high likelihood compared with a stepwise method or other such conventional methods. That is, a model of higher precision than a conventional one can be provided. In this regard, none of the conventional stepwise method, lasso regression, and elastic net consider any sign condition in the process of variable selection. In general, there is no choice but to find a set of explanatory variables satisfying sign conditions by trial and error.

The stepwise method or brute-force regression requires several maximum likelihood estimations, whereas this embodiment requires only one estimation. Also, the one estimation enables selection of explanatory variables as well as estimation of corresponding coefficients.

The lasso regression or elastic net generally involves additional analysis for determining the aforementioned hyperparameter. Also, the selection of explanatory variables generally depends on the way to determine the hyperparameter. This embodiment does not use a variable like the hyperparameter, and thus, requires no additional analysis. Furthermore, a set of explanatory variables, which maximizes the likelihood function under the sign conditions, can always be selected.

Second Embodiment

Any constraint can also be set together with the sign conditions. The constraints defines at least one of upper and lower limits for every possible value of each coefficient. Table 4 shows an example of the constraints. The constraints are stored in the auxiliary storage device 56.

TABLE 4

Sign Condition and Constraint

| Coefficient | Sign Condition | Constraint Upper Limit | Constraint Lower Limit |
|---|---|---|---|
| $\beta_1$ | 0 or more | | |
| $\beta_2$ | 0 or more | | 10.00 |
| $\beta_3$ | 0 or less | −1.00 | |
| $\beta_4$ | 0 or more | | |
| $\beta_5$ | 0 or less | | −250.00 |
| ... | ... | ... | ... |

In Table 4, empty fields of "upper limit" imply that no upper limit is set for a coefficient concerned. The same applies to the lower limit. For example, the lower limit is set to 10.00 for coefficient $\beta_2$, while no upper limit is set therefor. As for coefficient $\beta_1$, no constraint is set.

A constraint for a certain coefficient needs to match a sign condition thereof. If the sign condition is "0 or more", the upper and lower limits should be positive. If the sign condition is "0 or less", the upper and lower limits should be negative.

Figure 6:
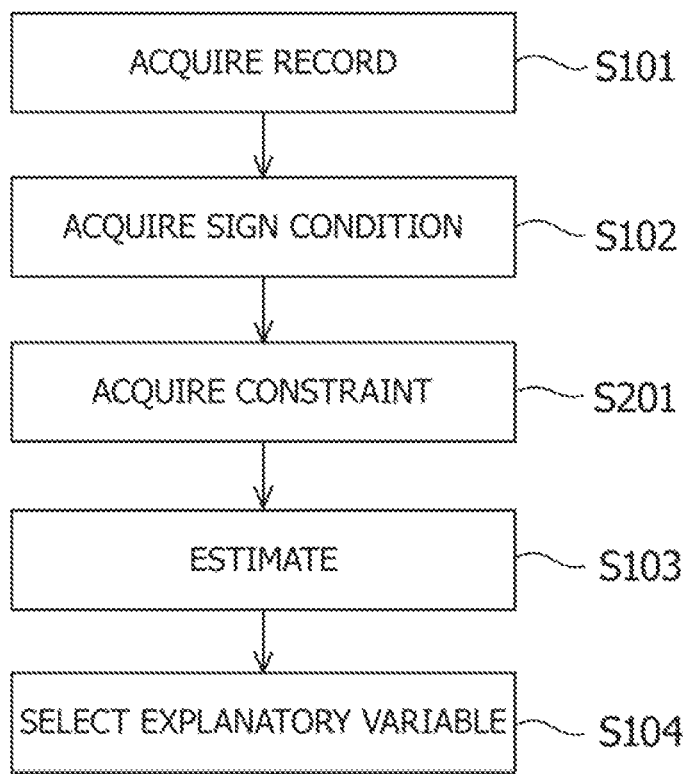
FIG. 6 is a flowchart of another procedure example executed by the variable selecting apparatus.

In this embodiment, the variable selecting apparatus 1 further includes a constraint acquisition unit (not shown). FIG. 6 shows a processing flow of the variable selecting apparatus 1. The difference from FIG. 3 is that step S201 is added between steps S102 and S103. In step S201, the constraint acquisition unit acquires constraints. Then, the estimation is made in step S103 under the sign conditions and the constraints, i.e., under condition $C_2$:

$C_2: \beta_1 \geq 0, \beta_2 \geq 10.0, \beta_3 \leq -1.0, \beta_4 \geq 0, -250.0 \leq \beta_5, \ldots$ Then, a maximum likelihood estimator of a parameter vector $\theta$ given by the estimation holds:

$$\hat{\theta} = \arg\max_{\theta \in C_2} \left\{ \prod_{i=1}^{N} PD_i^{D_i} (1 - PD_i)^{1-D_i} \right\}$$

Table 5 shows estimates of the parameters obtained in this step.

TABLE 5

Estimates of Constant/Coefficient

| Constant/Coefficient | Estimate |
|---|---|
| $\alpha$ | 5.66 |
| $\beta_1$ | 0.00 |
| $\beta_2$ | 10.00 |

TABLE 5-continued

Estimates of Constant/Coefficient

| Constant/Coefficient | Estimate |
|---|---|
| $\beta_3$ | −1.32 |
| $\beta_4$ | 2.77 |
| $\beta_5$ | −250.00 |
| ... | ... |

In this embodiment, coefficients $\beta_2$ and $\beta_3$, which are estimated to be zero in the first embodiment, are estimated to be non-zero.

The estimator of the coefficient given the upper or lower limit does not always match the upper or lower limit. As with coefficient $\beta_3$ in Table 5, a value greater than the upper or lower limit in absolute value, may be selected.

An absolute value of an estimator corresponding to the ratio of interest burden to sales (coefficient $\beta_5$) is decreased because of its lower limit. That is, the statistical model reduces an influence of the ratio of interest burden to sales. As with the current ratio (coefficient $\beta_4$) in Table 5, the estimator of a candidate explanatory variable with no constraint also differs from that in the first embodiment due to the influence of the change in coefficients of other candidate explanatory variables.

In subsequent step S104, the selection unit 40 selects explanatory variables. More specifically, it selects as desired explanatory variables a capital ratio, years of debt redemption, a current ratio, and a ratio of interest burden to sales corresponding to non-zero coefficient $\beta_2$-$\beta_5$, respectively.

This embodiment ensures that specific candidate explanatory variables, such as the capital ratio or the years of debt redemption, can be necessarily selected as desired explanatory variables by setting constraints. That is, it is possible to respond to a demand to "select some specific candidate explanatory variables as desired explanatory variables".

Furthermore, setting constraints prevent some specific explanatory variables from having too great influences on variable selection.

Third Embodiment

In this embodiment, the variable selecting apparatus 1 further includes a narrow-down condition acquisition unit and a narrow-down processing unit (both not shown). As shown in FIG. 7, if multiple explanatory variables are selected in step S104, steps S301 and S302 may follow this step.

In step S301, the narrow-down condition acquisition unit acquires narrow-down conditions. The narrow-down conditions are to narrow down the multiple explanatory variables selected in step S104. The narrow-down conditions are stored in the auxiliary storage device 56. Examples of the narrow-down conditions are:

"excluding explanatory variables of which the p-value or t-value is below a certain level"; and "deleting variables by backward elimination starting with a set of desired explanatory variables selected in step S104 (initial values)".

In step S302, the narrow-down processing unit executes narrow-down processing under the narrow-down conditions so as to reduce the number of explanatory variables.

According to this embodiment, setting the narrow-down conditions makes it possible to delete explanatory variables that are not statistically significant, and to build a model using fewer explanatory variables without lowering the model precision, i.e., with almost the same precision. Here, even if deleting explanatory variables that are not statistically significant, influence on coefficients corresponding to the other explanatory variables is very small. Hence, there is almost no risk that the sign conditions cannot be met due to the narrow-down processing.

Note that steps S301 and S302 may follow step S103 of FIG. 6.

Fourth Embodiment

An embodiment of the ordered logit model in which a response variable is expressed by an ordinal scale consisting of three or more values, is described below. The processing flow is similar to that of FIG. 3, except for the following.

Table 6 shows an example of model building data used for building an ordered logit model to estimate business ratings. The data is acquired in step S101.

TABLE 6

Model Building Data

| Business Attributes | | | | Financial Indicator (Candidate Explanatory Variable) | | | | |
|---|---|---|---|---|---|---|---|---|
| Business ID | Business Name | Business Type | Rating | Logarithm of Sales ($k=1$) | Capital Ratio ($k=2$) | Years of Debt Redemption ($k=3$) | Current Ratio ($k=4$) | Burden Ratio of Interest to Sales ($k=5$) |
| 1 | Business A | Construction | 2 | 9.016 | 46.82% | 6.43 | 129.95% | 1.29% ... |
| 2 | Business B | Manufacturer | 2 | 8.669 | 38.71% | 4.73 | 148.03% | 2.88% ... |
| 3 | Business C | Retailer | 4 | 9.474 | 19.86% | 16.82 | 101.74% | 4.51% ... |
| 4 | Business D | Supplier | 1 | 10.318 | 64.93% | 2.11 | 211.30% | 0.47% ... |
| . | . | . | . | . | . | . | . | . |
| . | . | . | . | . | . | . | . | . |

The "rating" indicates the level of business's debt payment ability in numbers or letters. In this embodiment, the credit ranks higher in right to left order of 1>2>3>4> ... >Nr where Nr represents the number of ratings. The ratings may be given letter grades like "AAA, AA+, AA, ... " or "grade A, grade B, grade C, ... ". Either indicates credit ranks, which can be rewritten in numbers as in this embodiment.

The model for estimating a business's rating like the ordered logit model is called a "rating estimation model". The rating estimation model is also a type of credit-evaluating model.

The rating estimation model, constructed using the ordered logit model, supposes that an estimate of a probability that the business i is given a rating s holds:

$$p_{i,s} \equiv Pr\{r_i = s\} = \frac{1}{1+\exp(Z_{i,s})} - \frac{1}{1+\exp(Z_{i,s-1})},$$

$$Z_{i,s} = \begin{cases} \infty & (s=0) \\ \alpha_s + \beta_1 X_{i,1} + \beta_2 X_{i,2} + \ldots & (1 \le s \le N_r - 1) \\ -\infty & (s = N_r) \end{cases}$$

where
$p_{i,s}$: a probability that the business i is given a rating s
$r_i$: a variable indicating a rating of the business i
$X_{i,k}$: an occurrence of a k-th possible explanatory variable for the business i
$Z_{i,s}$: a linear predictor for the rating s of the business i
$\alpha_s$: a constant term for $Z_{i,s}$
$\beta_k$: a coefficient corresponding to a possible explanatory variable (common to every s).

Likelihood function $L(\theta)$ of the rating estimation model is:

$$L(\theta) = \prod_{i=1}^{N} \prod_{s=1}^{N_r} p_{i,s}^{\delta_{i,s}} \quad (11)$$

where
$\delta_{i,s}$: a variable that is 1 for the rating s of the business i, or otherwise 0.

Regarding the rating estimation model, when executing estimation in step S103 under the sign conditions acquired in step S102 of FIG. 3, an estimate in the variable selecting model is calculated from:

$$\hat{\theta} = \arg\max_{\theta \in C_1} \{L(\theta)\}$$

where condition $C_1$ is the same as in the first embodiment, and $L(\theta)$ indicates the aforementioned likelihood function.

Table 7 shows examples of the parameters obtained in step S103.

TABLE 7

Estimates of Constant/Coefficient

| Constant/Coefficient | Estimate |
|---|---|
| $\alpha_1$ | 7.56 |
| $\alpha_2$ | 6.32 |
| ... | ... |
| $\alpha_{N_r}$ | 1.49 |
| $\beta_1$ | 0.00 |
| $\beta_2$ | 18.92 |
| $\beta_3$ | −1.88 |
| $\beta_4$ | 0.00 |
| $\beta_5$ | −78.12 |
| ... | ... |

Considering the results in Table 7, the capital ratio, the years of debt redemption, and the ratio of interest burden to sales, . . . are selected as explanatory variables in step S104.

As mentioned above, the variable selecting apparatus 1 can be configured to select desired explanatory variables from plural candidate explanatory variables in the statistical model that expresses, by a predetermined function, a relationship between plural linear predictors ($Z_{i,s}$) and an expectation value of a response variable or the probability of the response variable being certain values, by using the variable selecting model that defines the respective linear predictors by the sum of the constant and the linear combination of the candidate explanatory variables and their corresponding coefficients.

Fifth Embodiment

When a response variable is expressed by an ordinal scale consisting of three or more values, the following sequential logit model can be used for modeling as well. In the sequential logit model, plural binominal logit models for estimating the probability of being the rating s or less are used to estimate a probability for every rating. A processing flow is similar to FIG. 3.

$$q_{i,s} \equiv Pr\{r_i = s \mid r_i \ge s\} = \frac{1}{1+\exp(Z_{i,s})},$$

$$Z_{i,s} = \begin{cases} \alpha_s + \beta_{1,s} X_{i,1} + \beta_{2,s} X_{i,2} + \ldots & (1 \le s \le N_r - 1) \\ -\infty & (s = N_r) \end{cases}$$

$$p_{i,s} \equiv Pr\{r_i = s\} = \begin{cases} q_{i,s} & (s=1) \\ \prod_{r=1}^{s-1}(1-q_{i,r})q_{i,s} & (1 < s < N_r) \\ \prod_{r=1}^{N_r-1}(1-q_{i,r}) & (s = N_r) \end{cases}$$

where
$X_{i,k}$: an occurrence of a k-th possible explanatory variable for the business i
$Z_{i,s}$: a linear predictor for the rating s of the business i
$\alpha_s$: a constant term for $Z_{i,s}$
$\beta_{k,s}$: a coefficient corresponding to an explanatory variable k for $Z_{i,s}$ (that varies depending on s).

A likelihood function for the sequential logit model is exactly the same as the likelihood function (equation (11)) of the ordered logit model only except $p_{i,s}$.

When executing estimation with the sequential logit model in step S103 only under the sign conditions acquired in step S102, an estimate of the parameter in the variable selecting model is derived from:

$$\hat{\theta} = \arg\max_{\theta \in C_3} \{L(\theta)\}$$

where condition $C_3$ is:

$$C_3: \forall s, \beta_{1,s} \ge 0, \beta_{2,s} \ge 0, \beta_{3,s} \le 0, \beta_{4,s} \ge 0, \beta_{5,s} \le 0, \ldots$$

Table 8 shows examples of the parameters obtained in this embodiment.

TABLE 8

Estimates of Constant/Coefficient

| Indicator Name | Estimate | | | |
| --- | --- | --- | --- | --- |
|  | S = 1 | S = 2 | S = 3 | ... |
| $\alpha_s$ | 9.61 | 6.68 | 5.32 | ... |
| $\beta_{1,s}$ | 0.78 | 0.00 | 0.53 | ... |
| $\beta_{2,s}$ | 11.56 | 10.29 | 0.00 | ... |
| $\beta_{3,s}$ | −3.51 | 0.00 | −6.41 | ... |
| $\beta_{4,s}$ | 0.00 | 5.32 | 0.00 | ... |
| $\beta_{5,s}$ | −63.21 | 0.00 | −437.16 | ... |
| ... | ... | ... | ... | ... |

The coefficient and the constant are estimated for each value of $Z_{i,s}$ (each rating), and explanatory variables selected in step S104 also varies depending on $Z_{i,s}$.

As mentioned above, the variable selecting apparatus 1 can be configured to select desired explanatory variables from plural candidate explanatory variables in the statistical model that expresses, by a predetermined function, a relationship between plural linear predictors ($Z_{i,s}$) and an expectation value of a response variable or the probability of the response variable being certain values, by using the variable selecting model that defines at least one of the plural linear predictors (e.g., $Z_{i,2}$) by the sum of the constant and the linear combination of the plural candidate explanatory variables and their corresponding coefficients.

Other Embodiments

When the variable selection has been made, the original indicator itself can be used as a candidate explanatory variable but as needed, the power of the original indicator can be used instead. Alternatively, the original indicator subject to logarithmic transformation can substitute therefor.

In equation (4), the probability of the response variable being a certain value is given as the argument of function F. However, an expectation value of the response variable can be used as the argument of function F.

The sign conditions and constraints may not be set for all coefficients. It suffices to set the sign condition for at least one coefficient. Then, any constraint can be set for at least one of the sign-restricted coefficients.

The sign conditions can be stored in a storage device installed inside or outside the variable selecting apparatus 1 as well as in the auxiliary storage device 56. The same applies to the model building data, the constraints, and the narrow-down conditions. The model building data, the sign conditions, the constraints, and the narrow-down conditions can be stored in the same storage device or distributedly in plural storage devices.

The record acquisition unit 10 may be omitted, insofar as the estimation unit 40 can find an estimate using plural data including realizations of plural candidate explanatory variables and realizations of a response value.

In the fourth and fifth embodiments, either, or both of, the estimation with a constraint and a narrow-down processing with narrow-down conditions, can be further added.

The embodiments discussed in this specification encompass aspects of a method and computer program besides the apparatus.

The present invention is applicable to statistical models in a broader sense, which can be represented by a linear predictor, without being limited to the generalized linear model.

The present invention is described based on the embodiments but is not limited thereto. The present invention allows various modifications and changes made on the basis of technical ideas of the invention.

LIST OF REFERENCE SYMBOLS 1 variable selecting apparatus
10 record acquisition unit
20 sign condition acquisition unit
30 estimation unit
40 selection unit
51 CPU
52 interface device
53 display device
54 input device
55 drive device
56 auxiliary storage device
57 memory device
58 bus
59 recording medium

The invention claimed is:

1. An apparatus for selecting desired explanatory variables from a plurality of candidate explanatory variables in a statistical model for explaining and predicting a phenomenon, the statistical model expressing, by a predetermined function, a relationship between a linear predictor and an expectation value of a response variable or a probability of the response variable having certain values, by using a variable selecting model that expresses the linear predictor as a sum of a constant and a linear combination of the candidate explanatory variables and coefficients respectively corresponding to the candidate explanatory variables, the apparatus comprising a processor configured with:
    a sign condition acquisition unit for acquiring sign conditions that define every possible value of at least one of the coefficients as zero or more, or zero or less;
    an estimation unit for calculating an estimate of the respective coefficients and an estimate of the constant under the sign conditions, using a plurality of data inclusive of realizations of the respective candidate explanatory variables and realizations of the response variable; and
    a selection unit for selecting, as the desired explanatory variables, the candidate explanatory variables corresponding to each of the coefficients of which the estimate is calculated to be non-zero.

2. An apparatus for selecting desired explanatory variables from a plurality of candidate explanatory variables in a statistical model for explaining and predicting a phenomenon, the statistical model expressing, by a predetermined function, a relationship between a plurality of linear predictors and an expectation value of a response variable or a probability of the response variable having certain values, by using a variable selecting model that expresses at least one of the linear predictors as a sum of a constant and a linear combination of the candidate explanatory variables and coefficients respectively corresponding to the candidate explanatory variables, the apparatus comprising a processor configured with:
    a sign condition acquisition unit for acquiring sign conditions that define every possible value of at least one of the coefficients as zero or more, or zero or less;
    an estimation unit for calculating an estimate of the respective coefficients and an estimate of the constant under the sign conditions, using a plurality of data inclusive of an realizations of the respective candidate explanatory variables and an realizations of the response variable; and a selection unit for selecting, as the desired explanatory variable, the candidate explanatory variable corresponding to each of the coefficient of which the estimate is calculated to be non-zero.

3. The apparatus according to claim 1, wherein the estimation unit determines, as the estimates, values of the coefficients and constant which maximize a likelihood function of the variable selecting model under the sign conditions.

4. The apparatus according to claim 1, further comprising:
a constraint acquisition unit for acquiring predetermined constraints that define at least one of upper and lower limits for every possible value of at least one of the coefficients,
wherein the estimation unit calculates an estimate of the respective coefficients and an estimate of the constant under the sign conditions and the constraints.

5. The apparatus according to claim 4, wherein the estimation unit determines, as the estimates, values of the coefficients and constant which maximize a likelihood function of the variable selecting model under the sign conditions and the constraints.

6. The apparatus according to claim 1, further comprising, when the selection unit selects two or more of the explanatory variables,
a narrow-down condition acquisition unit for acquiring predetermined narrow-down conditions used to narrow down the selected explanatory variables, and
a narrow-down processing unit for narrowing down the explanatory variables based on the narrow-down conditions.

7. A method for selecting desired explanatory variables from a plurality of candidate explanatory variables in a statistical model for explaining and predicting a phenomenon, the statistical model expressing, by a predetermined function, a relationship between a linear predictor and an expectation value of a response variable or a probability of the response variable having certain values, by using a variable selecting model that expresses the linear predictor as a sum of a constant and a linear combination of the candidate explanatory variables and coefficients respectively corresponding to the candidate explanatory variables, the method being implemented on a computer comprising a processor configured to execute:
a sign condition acquisition step for acquiring sign conditions that define every possible value of at least one of the coefficients as zero or more, or zero or less;
an estimation step for calculating an estimate of the respective coefficients and an estimate of the constant under the sign conditions, using a plurality of data inclusive of realizations of the respective candidate explanatory variables and realizations of the response variable; and
a selection step for selecting, as the desired explanatory variable, the candidate explanatory variable corresponding to the coefficient of which the estimate is calculated to be non-zero.

8. A method for selecting desired explanatory variables from a plurality of candidate explanatory variables in a statistical model for explaining and predicting a phenomenon, the statistical model expressing, by a predetermined function, a relationship between a plurality of linear predictors and an expectation value of a response variable or a probability of the response variable having certain values, by using a variable selecting model that expresses at least one of the linear predictors as a sum of a constant and a linear combination of the candidate explanatory variables and coefficients respectively corresponding to the candidate explanatory variables, the method being implemented on a computer comprising a processor configured to execute:
a sign condition acquisition step for acquiring sign conditions that define every possible value of at least one of the coefficients as zero or more, or zero or less;
an estimation step for calculating an estimate of the respective coefficients and an estimate of the constant under the sign conditions, using a plurality of data inclusive of realizations of the respective candidate explanatory variables and realizations of the response variable; and
a selection step for selecting, as the desired explanatory variable, the candidate explanatory variable corresponding to the coefficient of which the estimate is calculated to be non-zero.

9. The method according to claim 7, wherein the estimation step comprises a step of determining, as the estimates, values of the coefficients and constant which maximize a likelihood function of the variable selecting model under the sign conditions.

10. The method according to claim 7, further comprising between the sign condition acquisition step and the estimation step, a constraint acquisition step for acquiring predetermined constraints that define at least one of upper and lower limits for every possible value of at least one of the coefficients,
wherein the estimation step comprises a step of calculating an estimate of the respective coefficients and an estimate of the constant under the sign conditions and the constraints.

11. The method according to claim 10, wherein the estimation step comprises a step of determining, as the estimates, values of the coefficients and constant which maximize a likelihood function of the variable selecting model under the sign conditions and the constraints.

12. The method according to claim 7, further comprising, when two or more of the explanatory variables are selected in the selection step,
a narrow-down condition acquisition step for acquiring predetermined narrow-down conditions used to narrow down the selected explanatory variables, and
a narrow-down processing step for narrowing down the explanatory variables based on the narrow-down conditions.

13. A non-transitory computer readable medium configured to store a program for selecting desired explanatory variables from a plurality of candidate explanatory variables in a statistical model for explaining and predicting a phenomenon, the statistical model expressing, by a predetermined function, a relationship between a linear predictor and an expectation value of a response variable or a probability of the response variable having certain values, by using a variable selecting model that expresses the linear predictor as a sum of a constant and a linear combination of the candidate explanatory variables and coefficients respectively corresponding to the candidate explanatory variables, the program causing a processor to execute:
a sign condition acquisition step for acquiring sign conditions that define every possible value of at least one of the coefficients as zero or more, or zero or less;
an estimation step for calculating an estimate of the respective coefficients and an estimate of the constant under the sign conditions, using a plurality of data inclusive of realizations of the respective candidate explanatory variables and realizations of the response variable; and a selection step for selecting, as the desired explanatory variable, the candidate explanatory variable corresponding to the coefficient of which the estimate is calculated to be non-zero.

14. A non-transitory computer readable medium configured to store a program for selecting desired explanatory variables from a plurality of candidate explanatory variables in a statistical model for explaining and predicting a phenomenon, the statistical model expressing, by a predetermined function, a relationship between a plurality of linear predictors and an expectation value of a response variable or a probability of the response variable having certain values, by using a variable selecting model that expresses at least one of the linear predictors as a sum of a constant and a linear combination of the candidate explanatory variables and coefficients respectively corresponding to the candidate explanatory variables, the program causing a processor to execute:

a sign condition acquisition step for acquiring sign conditions that define every possible value of at least one of the coefficients as zero or more, or zero or less;

an estimation step for calculating an estimate of the respective coefficients and an estimate of the constant under the sign conditions, using a plurality of data inclusive of realizations of the respective candidate explanatory variables and realizations of the response variable; and a selection step for selecting, as the desired explanatory variable, the candidate explanatory variable corresponding to the coefficient of which the estimate is calculated to be non-zero.

15. The non-transitory computer readable medium according to claim 13, wherein the estimation step comprises a step of determining, as the estimates, values of the coefficients and constant which maximize a likelihood function of the variable selecting model under the sign conditions.

16. The non-transitory computer readable medium according to claim 13, further comprising between the sign condition acquisition step and the estimation step, a constraint acquisition step for acquiring predetermined constraints that define at least one of upper and lower limits for every possible value of at least one of the coefficients, wherein the estimation step comprises a step of calculating an estimate of the respective coefficients and an estimate of the constant under the sign conditions and the constraints.

17. The non-transitory computer readable medium according to claim 16, wherein the estimation step comprises a step of determining, as the estimates, values of the coefficients and constant which maximize a likelihood function of the variable selecting model under the sign conditions and the constraints.

18. The non-transitory computer readable medium according to claim 13, further comprising, when two or more of the explanatory variables are selected in the selection step, a narrow-down condition acquisition step for acquiring predetermined narrow-down conditions used to narrow down the selected explanatory variables, and a narrow-down processing step for narrowing down the explanatory variables based on the narrow-down conditions.

* * * * *